United States Patent [19]
Badke

[11] Patent Number: 5,953,365
[45] Date of Patent: Sep. 14, 1999

[54] INTERFERENCE-TOLERANT SPREAD-SPECTRUM RECEIVER AND METHOD THEREFOR

[75] Inventor: Bradley P. Badke, Chandler, Ariz.

[73] Assignee: Sicom, Inc., Scottsdale, Ariz.

[21] Appl. No.: 08/853,157

[22] Filed: May 8, 1997

[51] Int. Cl.$^6$ .................................................. H04B 15/00
[52] U.S. Cl. ......................... 375/200; 375/206; 375/207; 375/316
[58] Field of Search .................................... 375/200, 206, 375/207, 316, 317, 346, 350

[56] References Cited

U.S. PATENT DOCUMENTS

| | | | |
|---|---|---|---|
| 5,271,038 | 12/1993 | Cai | 375/76 |
| 5,377,225 | 12/1994 | Davis | 375/1 |
| 5,596,600 | 1/1997 | Dimos et al. | 375/206 |
| 5,629,929 | 5/1997 | Blanchard et al. | 370/201 |
| 5,640,416 | 6/1997 | Chalmers | 375/206 |
| 5,673,286 | 9/1997 | Lomp | 375/208 |
| 5,825,810 | 10/1998 | Omura et al. | 375/200 |
| 5,844,936 | 12/1998 | Lesthievent | 375/206 |

OTHER PUBLICATIONS

Some Alternatives in Transform–Domain Suppression of Narrow–Band Interference for Signal Detection and Demodulation, by Stuart D. Sandberg, Stephen Del Marco, K. Jagler and M.A. Tzannes, Dec. 12, 1995.

*Primary Examiner*—Stephen Chin
*Assistant Examiner*—Mohammad Ghayour
*Attorney, Agent, or Firm*—Meschkow & Gresham,P.L.C.; Lowell W. Gresham; Jordan M. Meschkow

[57] ABSTRACT

An interference-tolerant spread-spectrum receiver (20) includes an FIR (finite impulse response) filter network (32) and a correlator/detector (34). The filter network (32) contains a pair of FIR filters (36) substantially identical to each other. A signal passes directly into the first filter (36'), but is delayed a predetermined amount of time before passing into the second filter (36"). Each of the filters (36) contains means for sampling (62) and windowing (70) the signal in the time domain; transforming (118) the signal to the frequency domain; limiting (130) and despreading (160) the signal in the frequency domain; and transforming (168) the signal back to the time domain. The signal from the first filter (36') is delayed the predetermined amount of time to resynchronize signals from both filters (36), which signals are then combined into a single signal. The combined signal is then passed into the correlator/detector (34), which determines the presence or absence of a spread-spectrum signal.

20 Claims, 5 Drawing Sheets

5,953,365

INTERFERENCE-TOLERANT SPREAD-SPECTRUM RECEIVER AND METHOD THEREFOR

TECHNICAL FIELD OF THE INVENTION

The present invention relates generally to spread-spectrum communications. More specifically, the present invention relates to a spread-spectrum receiver in which the effects of interference are mitigated.

BACKGROUND OF THE INVENTION

Direct-sequence spread-spectrum communication systems incorporate a modulation technique in which a narrow-band signal is spread over a broad frequency range using a spreading function known to both the transmitter and the receiver. While such a signal may contain a significant amount of total energy, the energy at any given frequency is minimal, even below the level of background noise. This allows the signal to blend into the noise.

Since the energy contained in the signal is very low at any given frequency, the signal is susceptible to interference, either coincidental or intentional. Narrow-band interference may insert sufficient energy to become spread over a broad frequency range during receiver processing and mask portions of the signal at the requisite specific frequencies. When such a signal is detected using conventional spread-spectrum reception techniques, the interference may produce false correlations and/or mask true correlations. Hence, the intelligence within the signal may be altered or obscured.

SUMMARY OF THE INVENTION

It is an advantage of the present invention that an interference-tolerant spread-spectrum receiver is provided.

It is a further advantage of the present invention that interference is mitigated through the use of a finite impulse response filter network and a correlator/detector.

It is an additional advantage of the present invention that signal normalization techniques are used to mitigate interference prior to signal despreading.

It is also an advantage of the present invention that the effects of signal normalization are increased through the use of windowing techniques in the time domain to inhibit interference spreading in the frequency domain.

Another advantage of the present invention is that the losses of signal energies encountered in windowing are compensated for through the use of first and second finite impulse response filters operating in parallel, where the signal in the second filter is delayed relative to the signal in first filter.

The above and other advantages of the present inventions are carried out in one form by a method for interference-tolerant reception of a spread spectrum signal comprising the steps of sampling the signal, transforming it to the frequency domain, limiting and despreading the signal, and transforming it back to the time domain.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
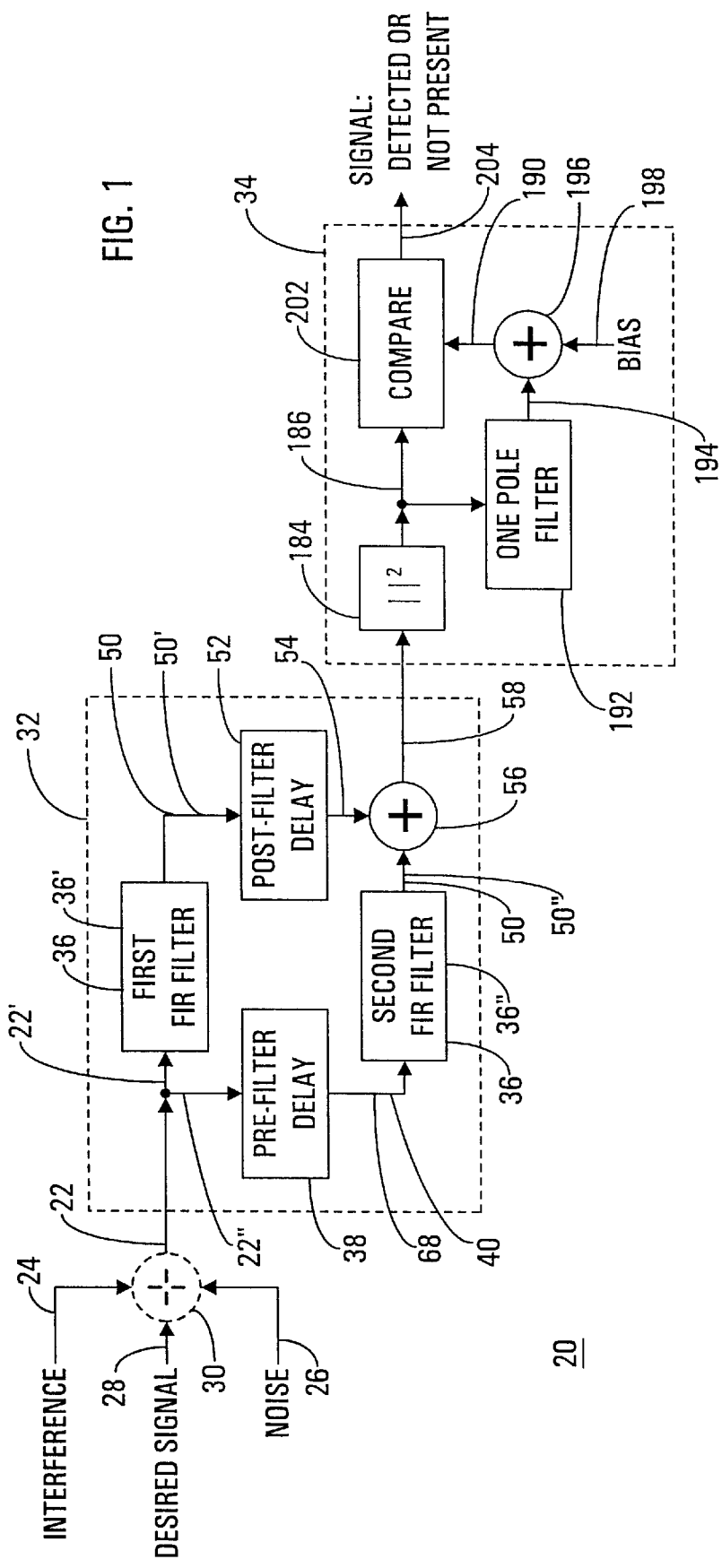
FIG. 1 shows a block diagram of an exemplary matched-filter spread-spectrum receiver in accordance with a preferred embodiment of the present invention.

FIG. 1 shows a block diagram of an exemplary matched-filter spread-spectrum receiver 20 in accordance with a preferred embodiment of the present invention. The following discussion refers to FIG. 1.

A composite input signal 22 is a combination of an interference signal 24 (which may be an unintentionally or intentionally-induced signal), electromagnetic noise 26, and a desired spread-spectrum signal 28. Signals 24, 26, and 28 are illustrated in FIG. 1 as being combined at a summing block 30. However, those skilled in the art will acknowledge that summing block 30 does not exist as a real entity. Interference signal 24, noise 26, and desired signal 28 are combined during propagation, i.e. in the "ether."

Input signal 22 can have a very low signal-to-noise ratio. Receiver 20 utilizes an FIR (finite impulse response) filter network 32 to apply a processing gain and significantly improve the signal-to-noise ratio. Filter network 32 couples to a correlator/detector 34 to detect the presence of desired signal 28.

Within filter network 32, input signal 22 is parallel-processed by a pair of FIR filters 36. Filters 36 include a first FIR filter 36' and a second FIR filter 36". In the present embodiment, first FIR filter 36' is substantially identical to second FIR filter 36". Unless specifically designated otherwise, references to FIR filter 36 (without ordinal modifier) and all components therein pertain to either first FIR filter 36' or second FIR filter 36".

Internally, FIR filter 36 windows input signal 22 (windowing to be discussed later), which causes a portion of the energy present in input signal 22 to be ignored. Therefore, input signal 22 is split into a first input signal 22' and a second input signal 22". A pre-filter delay 38 delays second input signal 22" a predetermined delay time to produce a delayed second input signal 40. Therefore, the input signal to first FIR filter 36' is first input signal 22', while the input signal to second FIR filter 36" is delayed second input signal 40.

Pre-filter delay 38 is shown solely for logical clarity and need not exist as a physical part. For example, a delay may be produced by continuously sampling signal 22 and utilizing different selected samples for signals 22' and 22".

In the preferred embodiment, first FIR filter 36' and second FIR filter 36" operate in parallel. FIR filters 36' and 36" differ in the fact that they process different signals, e.g. first FIR filter 36' processes first input signal 22' while second FIR filter 36" processes delayed input signal 40. Accordingly, the following discussion of FIR filter 36 applies to first FIR filter 36' and second FIR filter 36".

Each FIR filter 36 processes its respective input signal to produce a filtered signal 50. A first filtered signal 50' is provided from first FIR filter 36', and a second filtered signal 50" is provided from second FIR filter 36". In order to resynchronize first filtered signal 50' with second filtered signal 50", a post-filter delay 52 delays first filtered signal 50' the same predetermined delay time as pre-filter delay 38 to produce a delayed first filtered signal 54. Therefore, the effective output signal from first FIR filter 36' is a delayed version of first filtered signal 54, while the output signal from second FIR filter 36" is second filtered signal 50".

A summer/combiner 56 then recombines delayed first filtered signal 54 and second filtered signal 50" to produce an FIR filtered signal 58. FIR filtered signal 58 is the input to correlator/detector 34.

Figure 2:
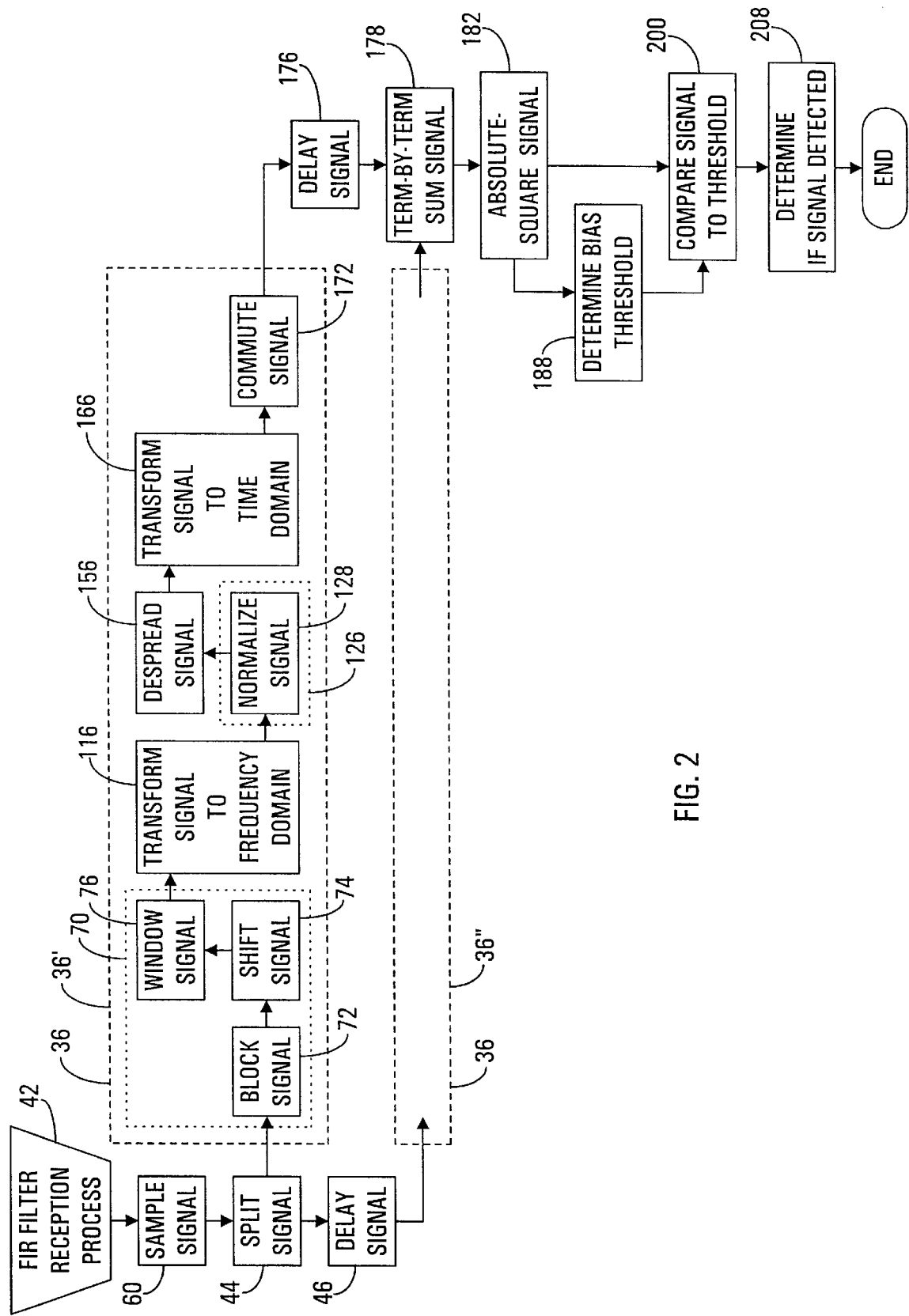
FIG. 2 shows a flowchart depicting an interference-tolerant spread-spectrum signal reception process.
Figure 3:
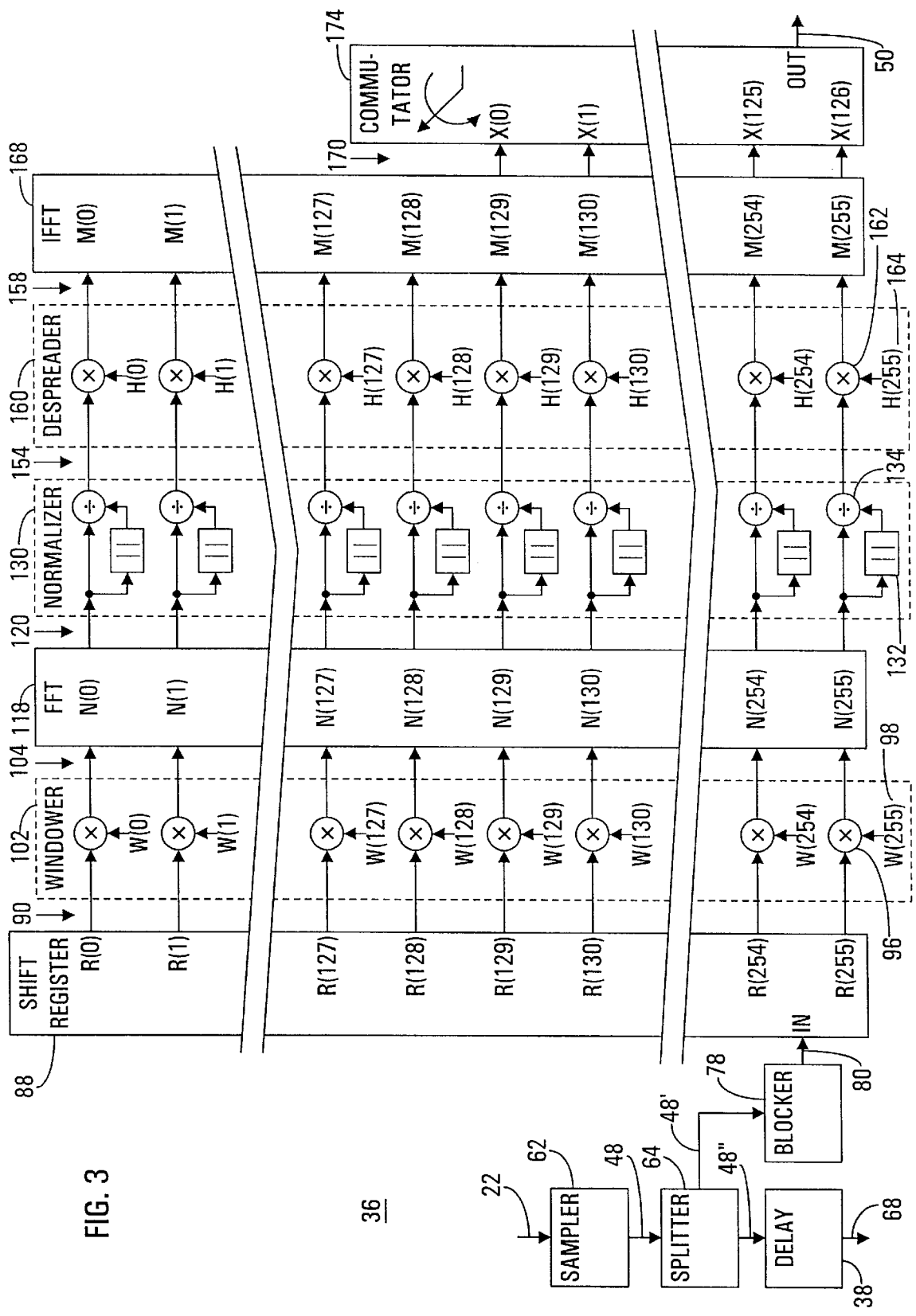
FIG. 3 shows a block diagram of a finite impulse response filter as exemplified in FIG. 1.
Figure 4:
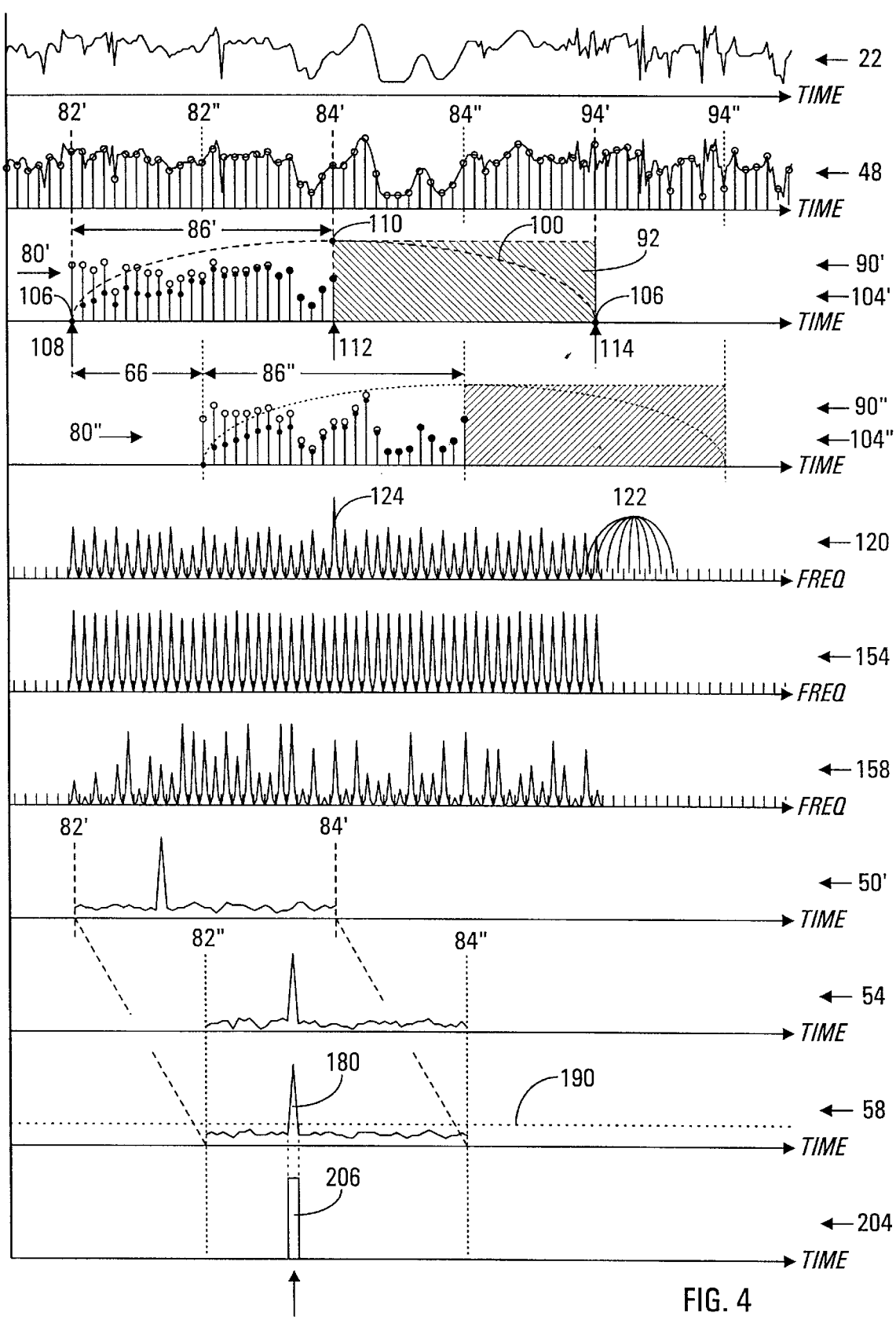
FIG. 4 shows an exemplary signal at multiple points during its propagation through a matched-filter spread-spectrum receiver as exemplified in FIGS. 1 and 3.

FIG. 2 shows a flowchart depicting an interference-tolerant spread-spectrum signal reception process 42, according to a preferred embodiment of the present invention. FIG. 3 shows a block diagram of FIR impulse response filter 36 as exemplified in FIG. 1. As previously mentioned, FIR filter 36 is representative of either first FIR filter 36' or second FIR filter 36". FIG. 4 shows an exemplary signal at multiple points during its propagation through a matched-filter spread-spectrum receiver 20 as exemplified in FIGS. 1 and 3. The following discussion follows process 42 (FIG. 2) while referring to FIGS. 3 and 4.

FIR filter 36, as exemplified herein, is an overlap-and-save FIR filter, i.e. it utilizes an overlap-and-save technique. Those skilled in the art will readily recognize that other techniques, such as overlap-and-add, may be utilized without departing from the scope and intent of the present invention. Overlap-and-save FIR filter 36 is depicted as it offers a slight improvement in performance (discussed below) over filters utilizing an overlap-and-add technique.

In a sampling task 60 of process 42, a sampler 62 (FIG. 3) continuously samples input signal 22 (FIG. 4) at a rate of one sample per spreading code chip, converting input signal 22 to a continuous series of one-chip sample points defining a sampled signal 48. Those skilled in the art will appreciate one sample per spreading code chip is exemplary of the preferred embodiment, and that it is possible to sample the input at other rates, i.e. more than one sample per spreading code chip.

In a splitting task 44 of process 42 (FIG. 2), which follows task 60, a splitter 64 (FIG. 3) then splits sampled signal 48 into first sampled signal 48' and a second sampled signal 48". Those skilled in the art will readily note that splitter 64 need not exist as a specific component. Indeed, splitter 64 need be nothing more than a circuit division directing sampled signal 48 to the input of first FIR filter 36' (FIG. 1) and pre-filter delay 38, where sampled signal 48 becomes first sampled signal 48' and second sampled signal 48", respectively.

The input signal to second FIR filter 36" (FIG. 1) is substantially identical to the input to first FIR filter 36', except that in a pre-filter delaying task 46 of process 42, pre-filter delay 38 delays second sampled signal 48" a predetermined delay time 66 (FIG. 4) of approximately one-half the block length (to be discussed later) to become a delayed second sampled signal 68 (FIG. 3). Therefore, in the preferred embodiment, the input signal to first FIR filter 36' (FIG. 1) is sampled signal 48', and the input signal to second FIR filter 36" is delayed second sampled signal 68.

In each FIR filter 36, a windowing subprocess 70 of process 42 performs a collecting task 72, a registering task 74, and a weighting task 76. Collecting task 72 utilizes as a collecting means a blocker 78 (FIG. 3). Blocker 78 divides sampled signal 48 into blocks of a predetermined number of samples to become a blocked signal 80 (FIG. 3). Blocker 78 may be essentially a counter or other logic circuit for determining when the requisite number of samples has been collected.

The number of samples within a block, i.e. the block length, is determined as a function of the length of the spreading code used to generate the original spread-spectrum signal. This determination is performed in a manner well known to those skilled in the art. In the preferred embodiment, a block contains 127 samples collected between a first block starting time 82' and a first block ending time 84' (FIG. 3) for first FIR filter 36', and a second block starting time 82" is and a second block ending time 84" for second FIR filter 36" (FIG. 4).

In exemplary receiver 20, sampled signal 48 passes through blocker 78 to become blocked signal 80 (FIG. 3). FIG. 4 depicts blocked signal 80 for first and second FIR filter 36' and 36" as a first blocked signal 80' and a second blocked signal 80" having durations of a first period of time 86' and a second period of time 86", respectively. Second blocked signal 80" is delayed from first blocked signal 80' by predetermined delay 66 due to the operation of task 46 (FIG. 2) and pre-filter delay 38 (FIGS. 1 and 3).

Registering task 74 of windowing subprocess 70 accepts blocked signal 80 into a shift register 88 (FIG. 3) after task 72. Shift register 88 is, in the preferred embodiment, a downward-shifting register having 256 datum locations (R0 through R255) with input at $R_{255}$ (datum location $R_{255}$). As each of the 127 sample data in blocked signal 80 (i.e. each of samples $S_0$ through $S_{126}$ [not shown] serially contained in blocked signal 80) is accepted into shift register 88, the data in shift register 88 are shifted downward. Once blocked signal 80 has been fully accepted, the previous contents of datum locations $R_{127}$ through $R_{255}$ have been shifted into datum locations $R_0$ through $R_{128}$, respectively, and samples $S_0$ through $S_{126}$ of blocked signal 80 have been shifted into datum locations $R_{129}$ through $R_{255}$ Shift register 88 then contains a shifted signal 90 (FIG. 3), consisting of a previous blocked signal 92 (FIG. 4) in locations $R_0$ through $R_{128}$ and blocked signal 80 in locations $R_{129}$ through $R_{255}$. FIG. 4 depicts shifted signal 90 as a first shifted signal 90' representing data between first block starting time 82' and a first extended block ending time 9' for first FIR filter 36', and a second shifted signal 90" representing data between second block starting time 82" and a second extended block ending time 94" for second FIR filter 36". Those skilled in the art appreciate that this is but one possible scenario for loading shift register 88 with the proper data at the proper locations.

Following task 74, windowing subprocess 70 performs weighting task 76. Task 76 utilizes a weighting multiplier 96 (FIG. 3) to multiply each datum of shifted signal 90 by a weighting coefficient 98. Weighting coefficient 98 is determined in conjunction with a weighting function 100 (FIG. 4) in a manner well known to those skilled in the art. In the preferred embodiment, each datum of shifted signal 90 is multiplied by a corresponding one of 256 weighting coefficients 98 ($W_0$ through $W_{255}$ in FIG. 3) by one of a bank of 256 weighting multipliers 96 contained within a windower 102. The weighting of shifted signal 90 produces a windowed signal 104. The value of each coefficient 98 derives from its position in weighting function 100 (FIG. 4), e.g. a four-term Blackman function, with each coefficient 98 being one of 256 sample points thereupon.

Referring to FIG. 4, weighting function 100 rises from a minimum value 106 of substantially zero amplitude in a region 108 proximate the beginning of the block of samples in shifted signal 90 (at or near datum $R_0$, FIG. 3), rises to a maximum value 110 in a region 112 proximate the center of the block of samples (at or near data $R_{127}$ and $R_{128}$), and falls to minimum value 106 in a region 114 proximate the end of the block of sample (at or near datum $R_{255}$).

Those skilled in the art may appreciate that while the four-term Blackman function exemplified herein fulfills this criteria for weighting function 100, other functions and other weighting curves may be used.

Since weighting function 100 is substantially at zero at both beginning and ending regions 108 and 114 of the block of samples, signal energy in regions 108 and 114 is lost. Since the signals in first FIR filter 36' and second FIR filter 36" are displaced by predetermined delay time 66, a first windowed signal 104' is at or near minimum value 106 when a second windowed signal 104" is at or near maximum value 110 and vice versa. Therefore, the processing of lost signal energy in one FIR filter 36 is compensated for in the other FIR filter 36.

Referring back to FIG. 2, in a transforming task 116 following windowing subprocess 70, a time-to-frequency transformer 118 (FIG. 3) transforms windowed signal 104 from the time domain to the frequency domain. In exemplary receiver 20, this is accomplished through the use of a fast Fourier transformer (FFT) for transformer 118. This transformation produces a transformed signal 120 contained within a plurality of frequency bins 122. In the preferred embodiment, transformer 118 produces 256 frequency bins 122 ($N_0$ through $N_{255}$, as shown in FIG. 4).

A standard sinc function response of transformer 118 to a pulse input would spread spectral energy over a significant number of frequency bins 122 (FIG. 4). Through the actions of windowing subprocess 70, especially weighting task 76, this spreading is significantly reduced. This has the effect of concentrating the preponderance of the energy from interference signal 24 into no more than a few frequency bins 122. This is exemplified in FIG. 4 by a single interference spike 124 in transformed signal 120.

The use of an overlap-and-save technique for FIR filter 36 allows windowing subprocess 70 to be expressed over two blocks of data, i.e. blocked signal 80 and previous blocked signal 92. This produces a 256 weighting coefficients 98, which is greater than the number of coefficients 98 produced by other techniques. For example, the use of an overlap-and-add technique would produce 128 coefficients 98. This increase in coefficients produces a greater precision in windowing subprocess 70, which in turn reduces the number of bins into which the interference signal 24 would be spread. The use of an overlap-and-save technique, therefore, provides an improvement in overall performance. Those skilled in the art, being familiar with both overlap-and-save and overlap-and-add techniques, among others, will readily discern that an overlap-and-save technique is preferred in exemplary receiver 20.

Following transforming task 116 (FIG. 2) a limiting subprocess 126 of process 42 is performed. Limiting subprocess 126 performs a normalizing task 128. In normalizing task 128, a normalizer 130 (FIG. 3) limits transformed signal 120.

Figure 5:
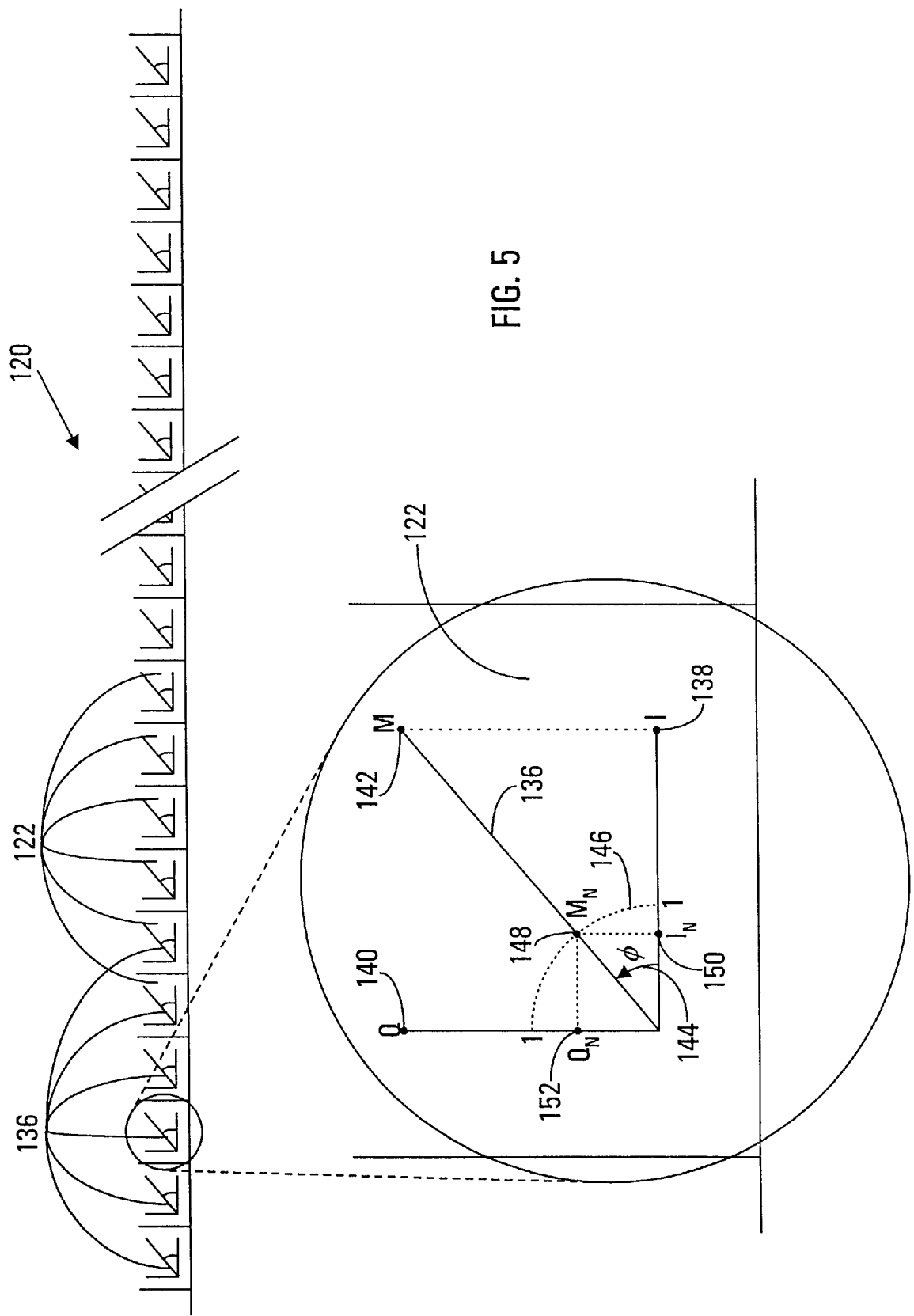
FIG. 5 shows a schematic representation of a plurality of frequency bins containing a plurality of complex signals in accordance with a preferred embodiment of the present invention.

FIG. 5 shows a schematic representation of plurality of frequency bins 122 containing a plurality of complex values 136 in accordance with a preferred embodiment of the present invention. The following discussion refers to FIGS. 4 and 5.

In the preferred embodiment, transformed signal 120 is a complex signal. Hence, all data within transformed signal 120 are quadrature data, i.e. each datum has a complex binary value 136 with an I (in-phase) component 138 and a Q (quadrature) component 140 when expressed in the Cartesian coordinate system, or with an M (magnitude) component 142 and a φ (phase) component 144 when expressed in the polar coordinate system.

In the preferred embodiment, the conveyed data are expressed by the phase relationship between I 138 and Q 140 components of complex value 136. In the polar coordinate system, that relationship is simply expressed as phase φ 144. M 142 may be altered to any value independently of φ 144, and normalizing M 142 to a value between 0.5 and 1.0 ($0.1_2$ and $1.0_2$) will not alter the phase relationship. This is shown graphically in FIG. 5, where M 142 is normalized by reducing its value to unity (that of a unity circle 146) to produce a normalized magnitude component $M_N$ 148, and therefore produce a normalized in-phase component $I_N$ 150 and a normalized quadrature component $Q_N$ 152 without altering φ.

Normalization of a given datum may be performed using a variety of techniques, four of which are shown below.

1. Normalize datum by discarding the characteristic of the magnitude:
    convert datum to polar coordinates, I,Q→M,φ, $$M, \phi = \sqrt{I^2 + Q^2}, \tan^{-1}\left(\frac{Q}{I}\right); \quad (1A)$$

express magnitude in binary scientific notation, $$M, \phi = m \times 2^c, \phi \text{ where } 0.1_2 \leq m \leq 1.0_2; \quad (1)$$

normalize magnitude by discarding its characteristic, $$M_N,\phi = m \times 2^0, \phi = m, \phi; \text{ and} \quad (1C)$$

convert normalized datum back to Cartesian coordinates, $M_N,\phi \rightarrow I_N,Q_N$, $$I_N,Q_N = M_n \cos \phi, M_n \sin \phi. \quad (1D)$$

2. Normalize datum by absolute division:
   determine the absolute magnitude, $$|M| = \left| \sqrt{I^2 + Q^2} \right| \quad (2A)$$

normalize I, Q by dividing by the absolute magnitude, $$I_N, Q_N = \frac{1}{|M|}, \frac{Q}{|M|}. \quad (2B)$$

3. Normalize datum by unitizing magnitude:
   determine phase, $$\phi = \tan^{-1}\left(\frac{Q}{I}\right); \quad (3A)$$

normalize datum by assuming unity magnitude and converting to Cartesian coordinates, $1,\phi \rightarrow I_N,Q_N$, $$I_N,Q_N = \cos \phi, \sin \phi. \quad (3B)$$

4. Normalize data by attenuating the magnitudes of only those data having large magnitudes, thus bringing all magnitudes into approximately the same range.

FIG. 3 depicts a technique for producing a normalized signal 154 (FIGS. 3 and 4) which is consistent with the "normalize by absolute division" technique, described as normalization technique 2 above. This is accomplished by passing each datum of transformed signal 120 through an absoluter 132, then utilizing a divider 134 to divide that datum of transformed signal 120 by the output of absoluter 132 to produce the corresponding datum of normalized signal 154. In this manner, each datum of transformed signal 120 is independently normalized. Through the use of independent normalization, the datum in a given frequency bin 122 does not affect a datum in an adjacent frequency bin 122. Those skilled in the art will readily discern other techniques of independently normalizing the data within transformed signal 120 to produce normalized signal 154.

Continuing the discussion of process 42 (FIG. 2) while referring to FIGS. 3 and 4, normalizing task 128 of limiting subprocess 126 limits transformed signal 120 (FIGS. 3 and 4) through normalization to produce normalized signal 154. In normalized signal 154, amplitude information has been eliminated by limiting signal amplitude to the range of 0.5 to 1.0 (0.1$_2$ to 1.0$_2$) in the preferred embodiment. Through this action, the effects of vagaries in the signal, such as interference spike 124 (FIG. 4) in transformed signal 120 are suppressed. Accordingly, independent normalization across frequency bins 122 effectively mitigates interference.

Following subprocess 126 (FIG. 2), a despreading task 156 despreads normalized signal 154 (FIGS. 3 and 4) to produce a despread signal 158. In the preferred embodiment, a despreader 160 (FIG. 3) uses one of a bank of 256 despreading multipliers 162 to multiply each datum of normalized signal 154 by a corresponding one of 256 despreading coefficients 164. Coefficients 164 are derived from the inverse of a predetermined spreading code in a manner familiar to those skilled in the art. The predetermined spreading code used for derivation is the same spreading code used to produce desired input signal 28 (FIG. 1) initially. Each coefficient 164 (Ho through H$_{255}$, as shown in FIG. 3) is peculiar to its position in the predetermined spreading code. This results in normalized signal 154 being despread into despread signal 158.

Process 42 performs an inversely transforming task 166 (FIG. 2) after task 156. In inversely transforming task 166, a frequency-to-time transformer 168 (FIG. 3), e.g. an IFFT (inverse fast Fourier transformer) in exemplary receiver 20, is used to transform despread signal 158, having 256 data in the frequency domain to a detransformed signal 170 having 256 terms in the time domain.

After task 166, a commuting task 172 then uses a commutator 174 (FIG. 3) to commute term $M_{129}$ through term $M_{255}$ of detransformed signal 170 into filtered signal 50. Term $M_0$ through term $M_{128}$ of detransformed signal 170 are ignored, as is conventional in the overlap-and-save technique utilized by FIR filter 36 exemplified in the preferred embodiment. Those skilled in the art will recognize that other techniques, such as overlap-and-add, may require different forms of commutation to produce filtered signal 50.

Tasks 72, 74, and 76 in subprocess 70, task 116, task 128 in subprocess 126, and tasks 156, 166, and 172 of process 42 are all performed within FIR filter 36. FIR filter 36 is a representation of both first FIR filter 36' and second FIR filter 36". All tasks if FIR filter 36' are performed in first FIR filter 36' and repeated in second FIR filter 36".

Continuing the discussion again following process 42 (FIG. 2) while referring to FIGS. 1 and 4, pre-filter delaying task 46 of process 42, as previously described, delayed sampled signal 48 by predetermined delay time 66 prior to passing delayed second sampled signal 68 to second FIR filter 36" (FIG. 1). To compensate for this delay, a post-filter delaying task 176, following task 172, uses post-filter delay 52 to delay first filtered signal 50' (FIG. 1) by predetermined delay time 66 to produce delayed first filtered signal 54. By this action, delayed first filtered signal 54 from first FIR filter 36' is restored to synchronization with second filtered signal 50" from second FIR filter 36".

A summing task 178 of process 42 (FIG. 2) then combines delayed first filtered signal 54 and second filtered signal 50" to produce FIR filtered signal 58. Delayed first filtered signal 54 and second filtered signal 50", each having multiple terms, are summed within summer/combiner 56 on a term-by-term basis. That is, each term of delayed first filtered signal 54 is independently summed with the corresponding term in second filtered signal 50" to produce a corresponding term in FIR filtered signal 58. FIR filtered signal 58, being a combination of the outputs of first and second FIR filters 36' and 36", is therefore the multiple-term output of filter network 32. This resynchronization and summing of signals 54 and 50" compensates for the effects of windowing (subprocess 70) and recaptures most of the signal-to-noise ratio lost thereby.

Desired signal 28 (FIG. 1), contained within composite input signal 22, was spread during transmission utilizing a specific spreading code. Despreading task 156 despread normalized signal 154 (FIG. 4), derived from input signal 22, utilizing a despreading code derived from the inverse of the same spreading code. When desired signal 28 is present, a correlation will exist between input signal 22 and FIR filtered signal 58. Such a correlation is manifest as a correlation spike 180 (FIG. 4) in FIR filtered signal 58. Correlation spike 180 is not present when there is no correlation.

FIR filtered signal 58 passes into correlator/detector 34 (FIG. 1). Process 42 performs an absoluting or magnitude task 182 after task 178. In task 182, correlation spike 180 is emphasized by an absolute squarer 184 (FIG. 1). Within absolute squarer 184, the absolute of FIR filtered signal 58 is multiplied against itself to produce an absolute or magnitude signal 186. In this manner, FIR filtered signal is converted to a positive real signal for use in subsequent comparisons. Simultaneously, correlation spike 180 is amplified much more than the remainder of FIR filtered signal 58.

After task 182, process 42 performs a biasing task 188. Biasing task 188 generates a comparison threshold 190 (FIGS. 1 and 4). Task 188 may employ a one-pole filter 192 (FIG. 1) to produce a dynamic bias 194 (FIG. 1). Dynamic bias 194 is an ongoing average of the magnitude of absolute signal 186. Since correlation spike 180, while significant in magnitude, is insignificant in duration when compared with the remainder of absolute signal 186, dynamic bias 194 is essentially a function of the amplitude of the non-signal remainder of absolute signal 186, i.e. interference signal 24 and noise 26. A summing circuit 196 then sums dynamic bias 194 with a predetermined static offset bias 198 (FIG. 1) to produce comparison threshold 190.

Following tasks 182 and 188 of process 42, a comparing task 200 compares absolute signal 186 (FIG. 1) against comparison threshold 190 in a comparator 202 (FIG. 1) to produce a binary detection signal 204 (FIGS. 1 and 4). If a correlation with desired signal 28 (FIG. 1) is present, binary detection signal 204 contains a detection pulse 206 (FIG. 4). Detection pulse 206 is present only where absolute signal 186 is greater in amplitude than comparison threshold 190, i.e. only where correlation spike 180 is present in FIR filtered signal (FIGS. 1 and 4).

Following task 200 in process 42, a determining task 208 then discerns whether or not a signal correlation has been made, i.e. whether or not detection pulse 206 is present in binary detection signal 204.

While one form of correlator/detector 34 has been described herein, those skilled in the art will understand that a variety of equivalent correlator/detector structures may be alternatively devised.

In summary, exemplary spread-spectrum receiver 20 mitigates interference signal 24 through the use of filter network 32 and correlator/detector 34. Filter network 32 utilizes signal normalization techniques to mitigate interference prior to despreading. The effects of signal normalization are increased through the use of windowing techniques in the time domain to inhibit interference spreading in the frequency domain. The losses of signal energies encountered in windowing are compensated for through the use of first and second FIR filters 36' and 36" operating in parallel, where the signal in second FIR filter 36" is delayed relative to the signal in first FIR filter 36'.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for interference-tolerant reception of a spread spectrum signal, said method comprising the steps of:

sampling said spread spectrum signal to produce a sampled signal;

windowing said sampled signal to produce a windowed signal;

collecting, within said windowing step, a block of samples from said sampled signal, said block of samples having a beginning region, a central region, and an end region;

weighting, within said windowing step, said block of samples by a weighting function which exhibits a minimum value proximate said beginning and end regions and a maximum value proximate said central region to produce said windowed signal;

transforming said windowed signal to a frequency domain to produce a transformed signal;

limiting said transformed signal in magnitude to produce a limited signal;

despreading said limited signal to produce a despread signal; and inversely transforming said despread signal to a time domain to produce a filtered signal.

2. A method for interference-tolerant reception of a spread spectrum signal, said method comprising the steps of:

sampling said spread spectrum signal to produce a sampled signal;

splitting said sampled signal into a first sampled signal and windowing, in response to said first sampled signal, said sampled signal to produce a windowed signal;

transforming, in response to said first sampled signal, said windowed signal to a frequency domain to produce a transformed signal;

limiting, in response to said first sampled signal, said transformed signal in magnitude to produce a limited signal;

despreading, in response to said first sampled signal, said limited signal to produce a despread signal;

inversely transforming, in response to said first sampled signal, said despread signal to a time domain to produce a filtered signal;

repeating said windowing, transforming, limiting, despreading, and inversely transforming steps in response to said second sampled signal; and combining said filtered signal produced in response to said first sampled signal with said filtered signal produced in response to said second sampled signal.

3. A method as claimed in claim 2 wherein:

each of said filtered signals exhibits a plurality of terms; and said combining step comprises the step of summing said filtered signals on a term by term basis.

4. A method as claimed in claim 2 wherein:

said windowing step performed in response to said first sampled signal comprises the step of collecting a first block of samples over a first period of time;

said windowing step performed in response to said second sampled signal comprises the step of collecting a second block of samples over a second period of time;

said second period of time is delayed relative to said first period of time; and said method additionally comprises the step of delaying, prior to said combining step, said filtered signal produced in response to said first sampled signal.

5. A method as claimed in claim 4 wherein:

said first and second blocks each contain a predetermined number of samples;

said second period of time is delayed approximately one-half of said predetermined number of samples relative to said first period of time; and said delaying step delays said filtered signal produced in response to said first sampled signal approximately one-half said predetermined number of samples.

6. A method for interference-tolerant reception of a spread spectrum signal., said method comprising the steps of:

sampling said spread spectrum signal to produce a sampled signal;

windowing said sampled signal to produce a windowed signal;

transforming, using an overlap-and-save finite impulse response filter, said windowing signal to a frequency domain to produce a transformed signal;

limiting said transformed signal in magnitude to produce a limited signal;

despreading, using said overlap-and-save finite impulse response filter, said limited signal to produce a despread signal; and inversely transforming, using said overlap-and-save finite impulse response filter, said despread signal to a time domain to produce a filtered signal.

7. A method for interference-tolerant reception of a spread spectrum signal, said method comprising the steps of:

sampling said spread spectrum signal to produce a sampled signal;

transforming said sampled signal to a frequency domain to produce a transformed signal;

limiting said transformed signal in magnitude to produce a limited signal;

normalizing, within said limiting step, said transformed signal;

despreading said limited signal to produce a despread signal; and inversely transforming said despread signal to a time domain to produce a filtered signal.

8. A method as claimed in claim 7 wherein:

said transformed signal comprises a plurality of frequency bins; and said normalizing step normalizes each of said frequency bins independently.

9. A method as claimed in claim 7 wherein:

said transformed signal is realized as a plurality of complex values, each of said complex values characterizing one of a plurality of frequency bins, and each of said complex values having a magnitude and a phase component; and said normalizing step modifies each of said complex values to substantially equalize said magnitude components relative to each other.

10. A method for interference-tolerant reception of a spread spectrum signal, said method comprising the steps of:

sampling said spread spectrum signal to produce a sampled signal;

transforming said sampled signal to a frequency domain to produce a transformed signal;

limiting said transformed signal in magnitude to produce a limited signal;

despreading said limited signal to produce a despread signal;

inversely transforming said despread signal to a time domain to produce a filtered signal; and comparing said filtered signal with a threshold to detect a correlation.

11. A method for interference-tolerant reception of a spread spectrum signal, said method comprising the steps of:

sampling said spread spectrum signal to produce a sampled signal;

windowing said sampled signal to produce a windowed signal;

collecting, within said windowing step, a block of samples from said sampled signal, said block of samples having a beginning region, a central region, and an end region;

weighting, within said windowing step, said block of samples by a weighting function exhibiting a minimum value proximate said beginning and end regions and a maximum value proximate said central region to produce said windowed signal;

transforming said windowed signal to a frequency domain to produce a transformed signal;

despreading said transformed signal to produce a despread signal; and inversely transforming said despread signal to a time domain to produce a filtered signal.

12. A method for interference-tolerant reception of a spread spectrum signal, said method comprising the steps of:

sampling said spread spectrum signal to produce a sampled signal;

windowing said sampled signal to produce a windowed signal;

transforming said windowed signal to a frequency domain to produce a transformed signal;

normalizing said transformed signal to produce a normalized signal;

despreading said normalized signal to produce a despread signal; and inversely transforming said despread signal to a time domain to produce a filtered signal.

13. A method as claimed in claim 12 wherein:

sad transformed signal is realized as a plurality of complex values;

each of said complex values has a magnitude component and a phase component contained within one of a plurality of frequency bins; and said normalizing step normalizes each of said frequency bins independently, substantially equalizing each of said magnitude components relative to each other.

14. A method for interference-tolerant reception of a spread spectrum signal, said method comprising the steps of:

sampling said spread spectrum signal to produce a sampled signal;

splitting said sampled signal into a first sampled signal and a second sampled signal;

windowing said first sampled signal to produce a first windowed signal;

transforming said first windowed signal to produce a first transformed signal;

despreading said first transformed signal to produce a first despread signal;

inversely transforming said first despread signal to produce a first filtered signal exhibiting a plurality of terms;

windowing said second sampled signal to produce a second windowed signal;

transforming said second windowed signal to produce a second transformed signal;

despreading said second transformed signal to produce a second despread signal;

inversely transforming said second despread signal to produce a second filtered signal exhibiting a plurality of terms; and summing said first filtered signal with said second filtered signal on a term by term basis.

15. A method as claimed in claim 14 herein said method additionally comprises the step of delaying, prior to said summing step, said first filtered signal.

16. A method as claimed in claim 15 wherein said second sampled signal is delayed relative to said first sampled signal.

17. A matched finite impulse response filter interference-tolerant spread-spectrum receiver comprising:

a sampler for sampling said spread spectrum signal to produce a sampled signal;

a first means, coupled to said sampler, for collecting, over a first period of time, a predetermined number of samples from said sampled signal;

a second means, coupled to said sampler, for collecting, over a second period of time, said predetermined number of samples from said sampled signal, wherein said second period of time is delayed relative to said first period of time by approximately one-half of said predetermined number of samples;

first windower and a second windower, coupled to said first and said second collecting means, respectively, for producing a first windowed signal and a second windowed signal;

a first time-frequency domain transformer and a second time-frequency domain transformer, coupled to said first and second windowers, respectively, for transforming said first and second windowed signals from a time domain into a frequency domain;

a first normalizer and a second normalizer, coupled to said first and second time-frequency domain transformers, respectively;

a first despreader and a second despreader, coupled to said first and second normalizers, respectively, for producing a first despread signal and a second despread signal;

a first frequency-time domain transformer and a second frequency-time domain transformer, coupled to said first and second despreaders, respectively, for transforming said first and second despread signals from said frequency domain into said time domain and producing a first filtered signal and a second filtered signal, each of said first and second filtered signals exhibiting a plurality of terms;

a means, coupled to said first frequency-time domain transformer, for delaying said first filtered signal approximately one-half said predetermined number of samples and producing a delayed first filtered signal; and a combiner, coupled to said delaying means and to said second frequency-time domain transformer, for summing said delayed first filtered signal with said second filtered signal on a term-by-term basis and producing a finite impulse response filtered signal.

18. A receiver as claimed in claim 17 wherein:

said first and second collecting means produce a first blocked signal and second blocked signal, respectively;

each of said first and second blocked signals has a beginning region, a central region, and an end region; and said first and second windowers weight said first and second blocked signals, respectively, by a weighting function exhibiting a minimum value proximate said beginning and end regions and a maximum value proximate said central region.

19. A receiver as claimed in claim 17, wherein:

said first and second time-frequency domain transformers produce a first transformed signal and a second transformed signal, respectively, in a frequency domain;

said first and second transformed signals are realized as a first plurality and a second plurality of complex values, respectively;

each of said complex values within said first and second pluralities of complex values has a magnitude component and a phase component and characterizes one frequency bin of a first plurality and a second plurality of frequency bins, respectively; and said first and second normalizers independently modify each of said complex values characterizing each of said frequency bins of said first and second pluralities of frequency bins, respectively, to substantially equalize said magnitude component relative to all magnitude components of all complex values within said first and second pluralities of complex values.

20. A receiver as claimed in claim 17 additionally comprising a detector for detecting a correlation by comparing said finite impulse response filtered signal with a threshold.

* * * * *

UNITED STATES PATENT AND TRADEMARK OFFICE
CERTIFICATE OF CORRECTION

PATENT NO. : 5,953,365
DATED : 14 September 1999
INVENTOR(S) : Paul Bradley Badke It is certified that error appears in the above-indentified patent and that said Letters Patent is hereby corrected as shown below:

Column 4, line 64 delete " 9' " and insert --94'--;

Column 6, line 43 delete "0.12 and insert --$0.1_2$--;

Column 11, line 31 (claim 6) delete the "." and insert --,--;

Column 12, line 63 (claim 13) delete the word "sad" and insert the word --said--;

Column 13, line 53 (claim 17) insert the letter --a-- as a word in front of the word "first"

Signed and Sealed this

Eighteenth Day of April, 2000

Attest:

Q. TODD DICKINSON

Attesting Officer     Director of Patents and Trademarks